(12) United States Patent
Hirai (10) Patent No.: US 7,397,209 B2
(45) Date of Patent: Jul. 8, 2008

(54) ACTUATOR

(75) Inventor: Masanori Hirai, Fuwa-gun (JP)

(73) Assignee: Nabtesco Corporation, Tokyo (JP)

( * ) Notice: Subject to any disclaimer, the term of this patent is extended or adjusted under 35 U.S.C. 154(b) by 29 days.

(21) Appl. No.: 11/461,011

(22) Filed: Jul. 31, 2006

(65) Prior Publication Data

US 2007/0194738 A1    Aug. 23, 2007

(30) Foreign Application Priority Data

Dec. 8, 2005  (JP) .................... P-2005-354215

(51) Int. Cl.
*H02P 1/00* (2006.01)
(52) U.S. Cl. .................... 318/280; 310/112; 310/80
(58) Field of Classification Search ............... 318/280; 310/112, 80; 74/89.34; 123/579; 261/34.1; 244/99.9
See application file for complete search history.

(56) References Cited

U.S. PATENT DOCUMENTS

2005/0269887 A1* 12/2005 Blanding et al. ............ 310/112

FOREIGN PATENT DOCUMENTS

JP    11-272332 A    10/1999

\* cited by examiner

*Primary Examiner*—Karen Masih
(74) *Attorney, Agent, or Firm*—Panitch Schwarze Belisario & Nadel LLP (57) ABSTRACT

An actuator includes a cylinder, a piston that is disposed in the cylinder and moves by supply and exhaust of working oil to and from the cylinder, a movable rod that is connected to the piston, a screw shaft, at least a part of which is inserted into the movable rod, a nut that is threaded to the screw shaft and moves integrally with the piston, and an electric motor that rotates the screw shaft forward or backward.

7 Claims, 8 Drawing Sheets

FIG. 7

ACTUATOR

BACKGROUND OF THE INVENTION

1. Field of the Invention

The present invention relates to an actuator that can drive a movable rod using fluid pressure or electric power.

2. Related Art

Japanese Patent Publication No. JP-A-11-272332 discloses a positioning cylinder device. The cylinder device has a ball screw and a nut that are disposed in a piston rod of a cylinder. In this configuration, a linear motion of the piston is converted into a rotation motion through the ball screw, and the rotation motion is converted into a positional signal by an angle sensor (for example, an encoder). Then, a switch valve is fed back on the basis of the signal, and the piston is positioned.

In JP-A-11-272332, with this configuration, a position of a stroke end of the piston rod can be changed. Further, in JP-A-11-272332, there is disclosed a case where the piston rod is driven by a motor as well as an electro-hydraulic servo valve.

However, according to the configuration of FIG. 1 of JP-A-11-272332, when an oil pressure is lost, it may be impossible to drive the piston, and thus redundancy enough to use as an actuator for driving a control surface of an aircraft may be not secured. Similarly, according to the configuration of FIG. 3 in JP-A-11-272332, if a voltage is lost, it may be impossible to drive the piston earliest.

SUMMARY OF THE INVENTION

The invention has been made in consideration of the above-described problems, and it is an object of the invention to provide a redundant actuator that can operate a movable rod using either electric power or fluid pressure.

The object of the invention is as described above. Now, means for solving the problems and advantages will be described.

According to an aspect of the invention, there is provided an actuator having the following configuration. That is, the actuator includes a cylinder, a piston that is disposed in the cylinder and moves by supply and exhaust of a working fluid to and from the cylinder, a movable rod that is connected to the piston, a screw shaft, at least a part of which is inserted into the movable rod, a nut that is screwed to the screw shaft and moves integrally with the piston, and an electric motor that rotates the screw shaft forward or backward.

With this configuration, it is possible to drive the movable rod using either electric power or fluid pressure. In addition, it is possible to provide an actuator having redundancy.

In the actuator according to the aspect of the invention, the output rotation of the electric motor may be transmitted to the screw shaft through a gear mechanism so as to drive the screw shaft.

With this configuration, the output rotation of the electric motor can be reliably transmitted to the screw shaft through the gear mechanism. Further, a degree of freedom for layout of the electric motor can be increased, and a compact actuator can be provided as a whole.

The actuator according to the aspect of the invention may further include a switch valve that switches the supply and exhaust of the working fluid to and from the cylinder.

With this configuration, the movable rod can be reliably driven using fluid pressure by a simple operation of switching of the switch valve.

The actuator according to the aspect of the invention may have the following configuration. The cylinder may be a reciprocating cylinder. The actuator may further include a mode selector valve that switches between at least two positions of a first position where one port of the cylinder and the other port do not communicate with each other and a second position where both ports communicate with each other.

With this configuration, when the movable rod is driven by the electric motor, the mode selector valve is switched to the second position, such that both ports communicate with each other. Therefore, locking of the piston by fluid pressure can be prevented, and thus the movably rod can be smoothly driven using electric power.

The actuator according to the aspect of the invention may have the following configuration. The actuator may further include a bias spring that biases the second switch value in a direction to be switched to the second position. In this case, the second switch value may be kept at the first position against the bias spring by working fluid pressure.

With this configuration, when the working fluid pressure is lost, the second switch value is automatically switched to the second position by the bias spring, such that both ports communicate with each other. Therefore, locking of the piston by fluid pressure can be prevented, and thus the piston can keep a state suitable for driving of the movable rod by electric power.

In the actuator according to the aspect of the invention, at the second position, the mode selector valve may cause one port of the cylinder and the other port to communicate with each other through an orifice valve.

With this configuration, excessive vibration of a member to be driven can be reduced by a fluid pressure damping effect.

In the actuator according to the aspect of the invention, the movable rod may be connected to a control surface of an aircraft.

That is, the above-described actuator is particularly suitable for an aircraft that requires a redundant driving mechanism.

DETAILED DESCRIPTION OF THE PREFERRED EMBODIMENTS

Figure 1:
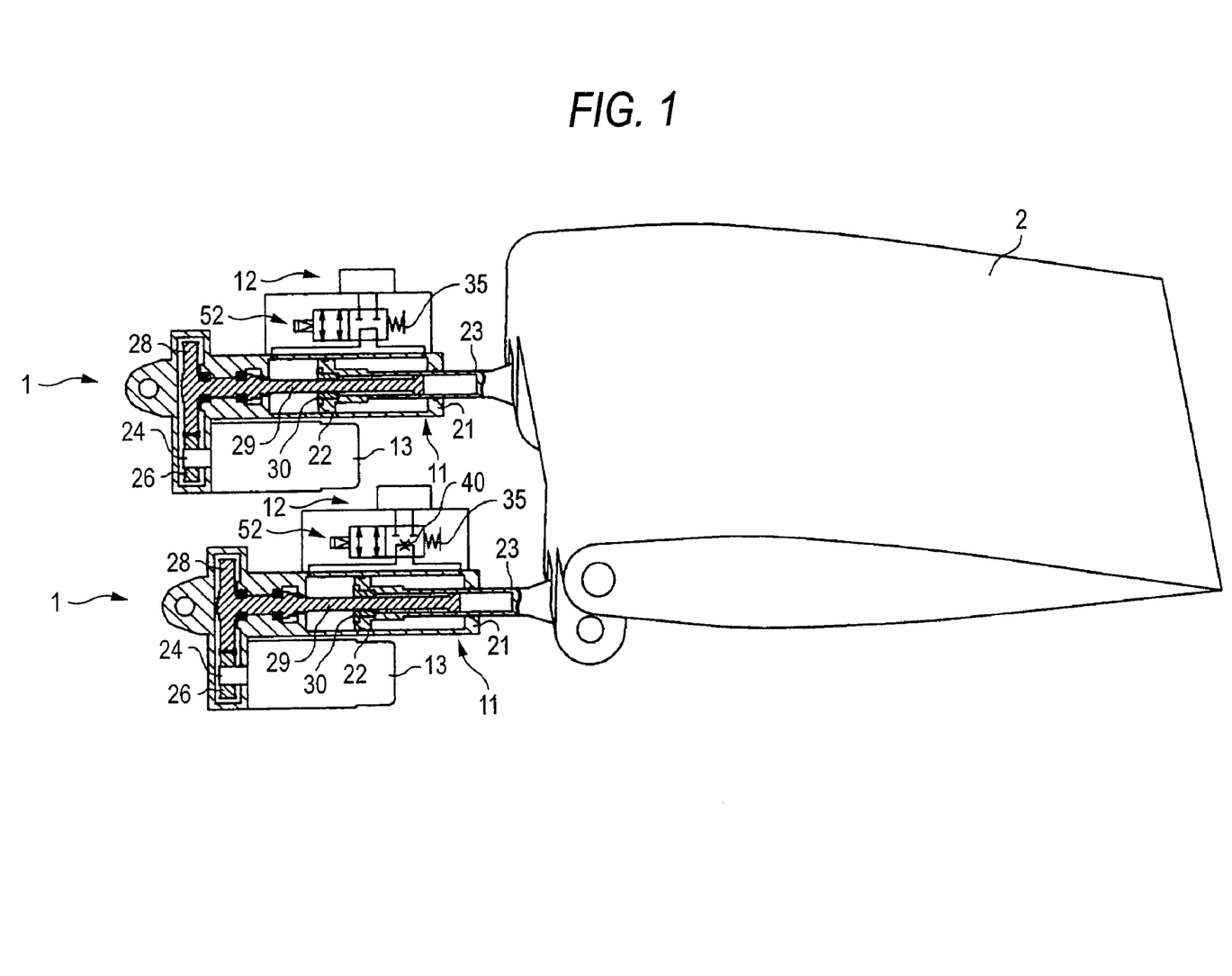
FIG. 1 is a schematic perspective view showing the configuration for driving a control surface by an actuator according to an embodiment of the invention.
Figure 2:
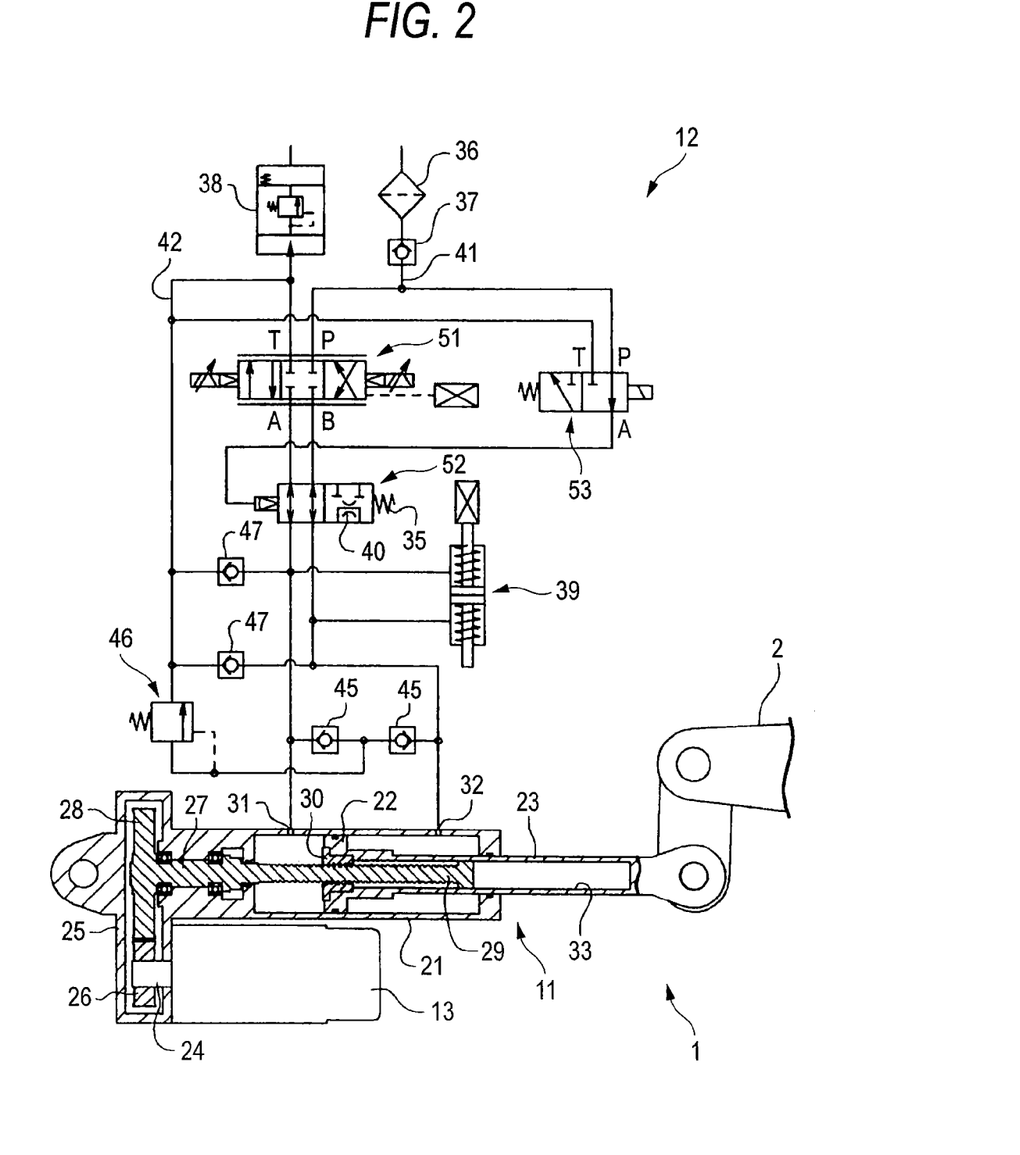
FIG. 2 is a cross-sectional view showing the configuration of an individual actuator and a circuit diagram of an oil pressure circuit.

Next, an embodiment of the invention will be described. FIG. 1 is a schematic perspective view showing the configuration for driving a control surface by an actuator according to an embodiment of the invention. FIG. 2 is a cross-sectional view showing the configuration of an individual actuator and a circuit diagram of an oil pressure circuit.

Actuators 1 shown in FIG. 1 are to drive a control surface 2 provided in an aircraft. Two actuators 1 are provided in a pair. FIG. 2 shows the configuration of an individual actuator 1. The actuator 1 primarily includes a cylinder mechanism 11, an oil pressure circuit 12 that drives the cylinder mechanism 11, and an electric motor 13 that drives the cylinder mechanism 11.

The cylinder mechanism 11 includes a cylinder 21, and a piston 22 that is disposed in the cylinder 21. The piston 22 is fitted into the cylinder 21 oil-tight, and reciprocates in an axial direction of the cylinder 21. The piston 22 is provided to divide the internal space of the cylinder 21 into two spaces. The divided two spaces communicate with ports 31 and 32 to be described below, respectively.

One end of a movable rod 23 is integrally connected to the piston 22. The other end of the movable rod 23 protrudes from the cylinder 21, and is connected to the control surface 2 of the aircraft.

The two ports 31 and 32 that can perform supply and exhaust of working oil (working fluid) are formed in the cylinder 21. The cylinder mechanism 11 is a so-called reciprocating hydraulic cylinder. Hereinafter, an oil pressure circuit 12 that performs supply and return pressure oil to and from the two ports 31 and 32 so as to drive the piston 22 will be described. The oil pressure circuit 12 primarily includes a pressure line 41 that supplies pressure oil, a compensator line 42 that returns pressure oil, a switch valve 51, a mode selector valve 52, and a solenoid valve 53.

The switch valve 51 is a three-position switch type, and includes four ports P, T, A, and B. Further, the solenoid valve 53 is a two-position switch type, and includes three ports P, T, and A. The pressure line 41 has two branches. One of the two branches is connected to the port P of the switch valve 51, and the other is connected to the port P of the solenoid valve 53. In addition, the port T of the switch valve 51 and the port T of the solenoid valve 53 are connected to the tank line 42.

The switch valve 51 can be switched among three positions of a position where all the ports P, T, A, and B are blocked, a position where the ports P and A, and the ports T and B communicate with each other, and a position where the ports P and B, and the ports T and A communicate with each other by a solenoid. With this configuration, the supply of working oil to the individual ports 31 and 32 of the cylinder 21 is switched, and thus the piston 22 and the movable rod 23 can be hydraulically driven in a desired direction.

The mode selector valve 52 is disposed between the switch valve 51 and the cylinder 21 and is configured to switch between a hydraulically driving mode and an electrically driving mode. Specifically, the mode selector valve 52 can be switched between a first position where the ports A and B of the switch valve 51 respectively communicate with the ports 31 and 32 of the cylinder 21, and a second position where the ports A and B are blocked and the ports 31 and 32 of the cylinder 21 communicate with each other. At the second position, the ports 31 and 32 communicate with each other through an orifice valve 40 that limits a flux of working oil.

A bias spring 35 is attached to the mode selector valve 52 and biases a valve body, such that the mode selector valve 52 is switched to the second position. Meanwhile, the solenoid valve 53 is an electromagnetic valve. The solenoid valve 53 can be switched between the position of the PA connection and the position of the TA connection in connection with the operation of an operator (not shown). Then, working oil of the port A of the solenoid valve 53 is guided, and thus the valve body of the mode selector valve 52 can be repelled against the bias spring 35.

A filter 36 that filters working oil or a check valve 37 that prevents flowing backward is provided in the pressure line 41. Further, a pressure holding mechanism 38 that appropriately holds a pressure of the tank line 42 is provided in the tank line 42.

A differential pressure sensor 39 that detects a differential pressure between the two ports 31 and 32 of the cylinder 21, a relief valve 46 that regulates an oil pressure of the entire circuit to be connected to both ports 31 and 32 through the check valve 45, or a check valve 47 that supplies working oil of the tank line 52 when the pressure of the ports 31 and 32 of the cylinder 21 is decreased is provided in the oil pressure circuit 12.

Next, a driving transmission path from the electric motor 13 to the piston 22 will be described. The electric motor 13 is attached to the side of the cylinder 21. An output shaft 24 of the electric motor 13 protrudes to the inside of a housing 25 that is formed integrally with the cylinder 21. An output gear 26 is fixed to a front end of the output shaft 24.

A transmission shaft 27 is rotatably supported on the housing 25. The transmission shaft 27 is provided to be concentric to an axial line of the cylinder 21. A large-diameter gear 28 is fixed to one end of the transmission shaft 27. The large-diameter gear 28 is meshed with the output gear 26. The output gear 26 and the large-diameter gear 28 are spur gears.

The other end of the transmission shaft 27 extends to an internal space of the cylinder 21, and a screw is provided on a circumferential surface of the extending portion so as to form a screw shaft 29.

An insertion hole 33 is formed in the piston 22 and the movable rod 23, and the movable rod 23 is formed in a hollow cylindrical shape. A part of the screw shaft 29 is inserted into the insertion hole 33. Further, a nut 30 is fixed to a portion of the piston 22. The nut 30 is screwed to the screw shaft 29.

With this configuration, in FIG. 1, the solenoid valve 53 is switched to the position of the PA connection. As a result, the mode selector valve 52 is hydraulically pressed in a direction against the bias spring 35 and then is switched to the first position. The position corresponds to the hydraulically driving mode. In this state, the port 31 of the cylinder 21 is connected to the port A of the switch valve 51, and the port 32 of the cylinder 21 is connected to the port B of the switch valve 51 (both ports 31 and 32 of the cylinder 21 do not communicate with each other). Then, if the switch valve 51 is switched, the working oil of the pressure line 41 is supplied to any one of the ports 31 and 32 so as to hydraulically drive the piston 22. Therefore, the control surface 2 that is connected to the piston 22 through the movable rod 23 can obliquely move in a desired direction.

Next, a case where the oil pressure of the pressure line 41 is lost due to a failure of a hydraulic pump (not shown) etc. will be considered. In this case, the oil pressure pressing the valve body of the mode selector valve 52 is lost, and thus the mode selector valve 52 is automatically switched to the second position by spring force of the bias spring 35. This state is referred to as the electrically driving mode. When the electric motor 13 rotates forward and backward, the output rotation of the output shaft 24 is decelerated through a gear mechanism having the output gear 26 and the large-diameter gear 28 while a torque is increased. Then, the transmission shaft 27 and the screw shaft 29 rotate, and this rotation motion is converted into the linear motion of the nut 30. In the above-described electrically driving mode, since the mode selector valve 52 is located at the second position, the port 31 and the port 32 communicate with each other, such that the movement of the piston 22 is not locked by the oil pressure in the cylinder 21. As such, the piston 22 and the movable rod 23 are screw-driven, and the control surface 2 can rotate in a desired direction.

The orifice valve 40 is formed in the mode selector valve 52. When the mode selector valve 52 is switched to the second position (the electrically driving mode), the ports 31 and 32 of the cylinder 21 are connected to each other through the orifice valve 40. Accordingly, predetermined resistance can be given to the movements of the piston 22 and the movable rod 23 (damping effect), and a phenomenon that the control surface 2 resonates and minutely vibrates (so-called fluttering) during high-speed flying of an aircraft can be suppressed.

In the above description, a case where the electrically driving mode is automatically selected when the pressure of the pressure line 41 is lost has been explained. However, the solenoid valve 53, an electromagnetic valve, may be switched to the TA connection position, and then the mode selector valve 52 may be switched to the second position, thereby setting the electrically driving mode (for example, forcibly).

As described above, the actuator 1 of this embodiment includes the cylinder 21, the piston 22 that is disposed in the cylinder 21 and moves by the supply and exhaust of working oil to the ports 31 and 32, the movable rod 23 that is connected to the piston 22, the screw shaft 29, at least a part of which is inserted into the movable rod 23, the nut 30 that is screwed to the screw shaft 29 and moves integrally with the piston 22, and the electric motor 13 that rotates the screw shaft 29 forward or backward. Accordingly, the movable rod 23 can be driven using either electric power or oil pressure, and an actuator having redundancy can be provided.

In the actuator 1 of this embodiment, the output rotation of the electric motor 13 is transmitted to the screw shaft 29 through the gear mechanism having the output gear 26 and the large-diameter gear 28 so as to drive the screw shaft 29. Hence, the output rotation of the electric motor 13 can be reliably transmitted to the screw shaft 29 through the gear mechanism. Further, since the electric motor 13 can be disposed distant from the cylinder 21, a degree of freedom for layout of the electric motor 13 is excellent, and a compact actuator 1 can be provided as a whole. In addition, like the above-described embodiment, the gear mechanism may have a deceleration function or an acceleration function.

The actuator 1 of this embodiment further includes the switch valve 51 that switches the supply and exhaust of working oil to and from the cylinder 21. Accordingly, the movable rod 23 can be reliably hydraulically driven by a simple operation of switching of the switch valve 51.

In this embodiment, the cylinder 21 is the reciprocating cylinder, and the actuator 1 further includes the mode selector valve 52 that switches between the two positions of the first position where one port 31 of the cylinder 21 and the other port 32 do not communicate with each other and the second position where both ports 31 and 32 communicate with each other. Accordingly, when the movable rod 23 is driven by the electric motor 13, the mode selector valve 52 is switched to the second position, such that both ports 31 and 32 communicate with each other. Therefore, locking of the piston 22 by oil pressure can be prevented, and thus the movable rod 23 can be smoothly driven using electric power.

The actuator of this embodiment further includes the bias spring 35 that biases the second switch value 52 in a direction to be switched to the second position. Further, the second switch value 52 is kept at the first position against the bias spring 35 by the working oil pressure. Accordingly, when the working oil pressure is lost, the second switch value 52 is automatically switched to the second position by the bias spring 35, such that both ports 31 and 32 communicate with each other. Therefore, locking of the piston 22 by oil pressure can be prevented, and thus the piston 22 can keep a state suitable for driving of the movable rod 23 by electric power.

In the actuator 1 of this embodiment, as shown in FIG. 2, at the second position, the mode selector valve 52 causes one port 31 of the cylinder 21 and the other port 32 to communicate with each other through the orifice valve 40. Accordingly, an oil pressure damping effect can be exhibited, and excessive vibration of the member to be driven (the control surface 2) can be attenuated.

In the actuator 1 of this embodiment, the movable rod 23 is connected to the control surface 2 of the aircraft. Therefore, the actuator 1 can be suitable for an aircraft that requires a redundant driving mechanism.

Although the configuration of the invention has been described, this is just an example. For example, the following modifications can be made.

A battery may be connected to the electric motor 13, and an energy generated by the rotation of the output shaft 24 according to driving of the piston 22 in the hydraulically driving mode. Then, in the electrically driving mode, the screw shaft 29 may be driven using the recovered energy.

In the above-described embodiment, the screw shaft 29 and the nut 30 forming a linear driving mechanism have the ball screw. However, a trapezoidal screw may be used. Further, in addition to the oil pressure, other working fluid pressure, such as air pressure, may be used.

The mode selector valve 52 may be an electromagnetic valve that is switched by an electrical signal, not a valve that is switched by the oil pressure from the solenoid valve 53. In this case, the oil pressure of the pressure line 41 may be monitored by an appropriate sensor. Then, if abnormality, such as a reduction in oil pressure, is detected, the mode selector valve 52 may be controlled to be automatically switched to the second position.

The solenoid valve 53 may not be provided, and working oil of the pressure line 41 may be directly guided to the mode selector valve 52.

The orifice valve 40 of the mode selector valve 52 may not be provided according to the uses. For example, as shown in FIG. 1, in one of the two actuators 1, the orifice valve 40 of the mode selector valve 52 is not provided. In this configuration, fluttering of the control surface 2 can also be prevented by the orifice valve 40 of the other actuator 1.

Figure 3:
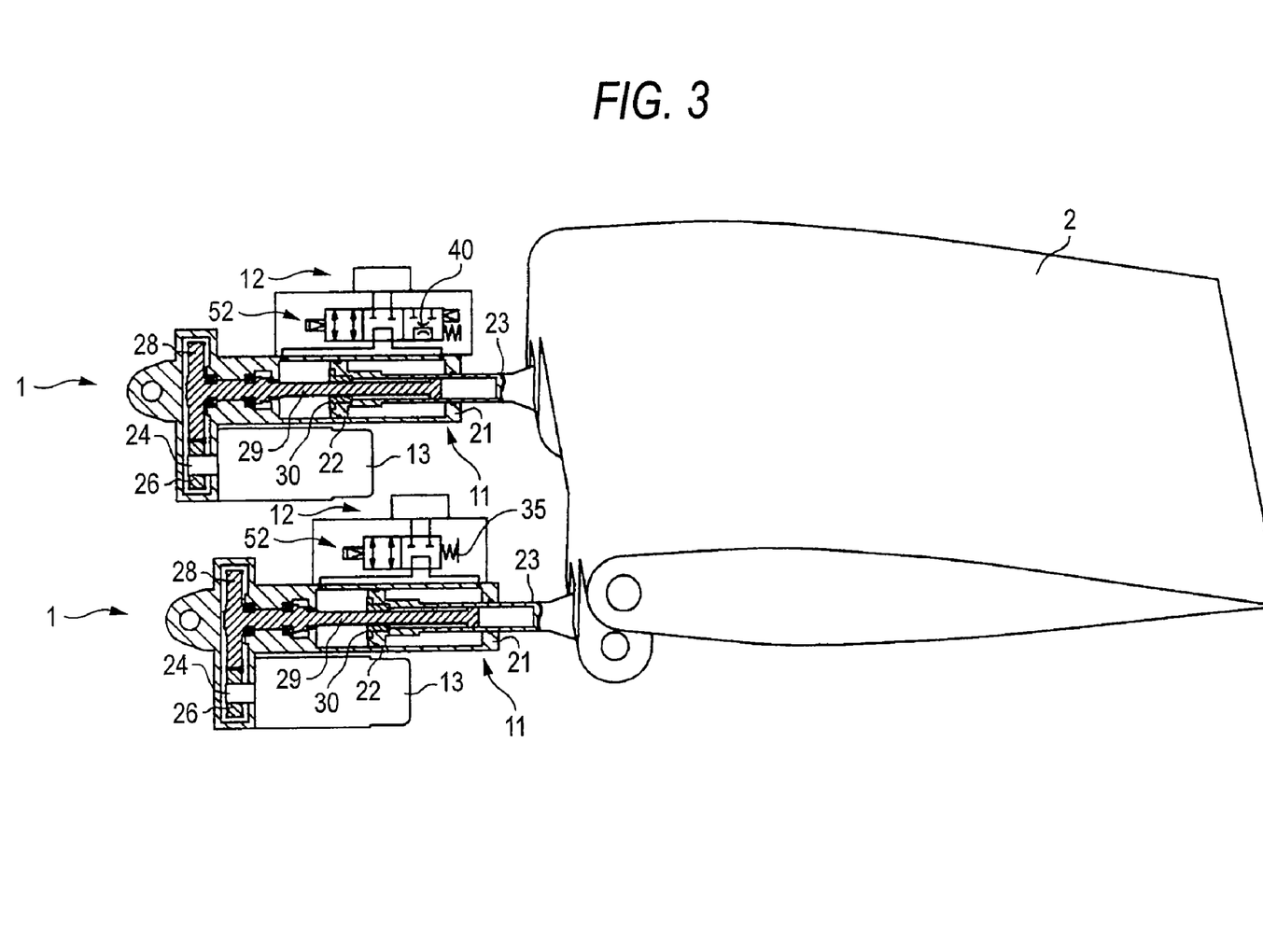
FIG. 3 is a schematic perspective view showing a first modification of the actuator.

Like an actuator 1 on the upper side of FIG. 3, the mode selector valve 52 may be switched among a first position where the two ports 31 and 32 of the cylinder 21 do not communicate with each other, a second position where both ports 31 and 32 communicate with each other with no orifice valve, and a third position where both ports 31 and 32 communication with each other through the orifice valve 40. In this configuration, the mode selector valve 52 is switched to the second position during low-speed flying. Meanwhile, during high-speed flying when fluttering of the control surface 2 may occur, the mode selector valve 52 is controlled to be switched to the third position.

Figure 4:
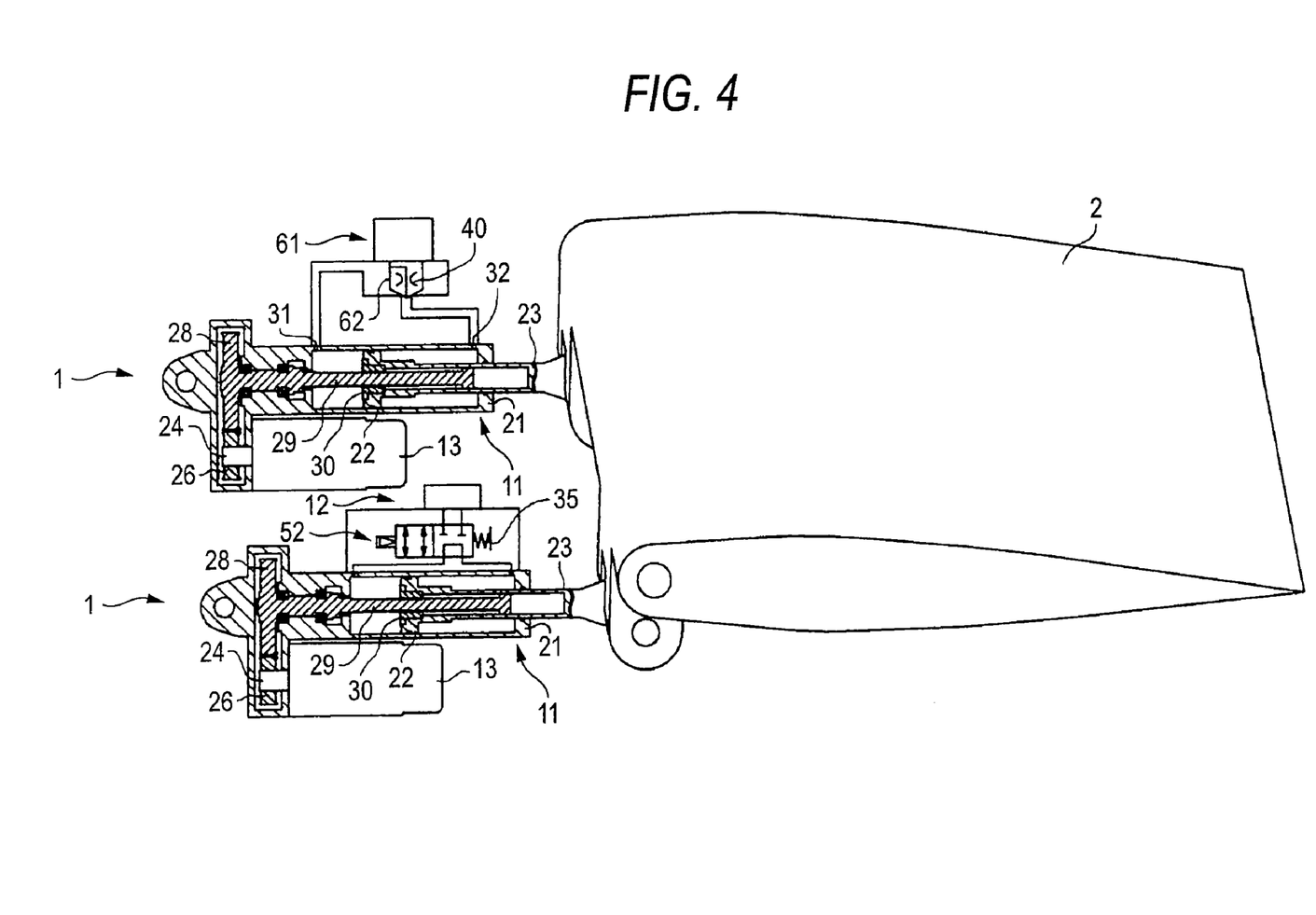
FIG. 4 is a schematic perspective view showing a second modification of the actuator.

As shown in FIG. 4, one actuator 1 (on the upper side) may be driven by only the electric motor 13, and the ports 31 and 32 of the cylinder 21 of one actuator 1 may be connected to each other through an orifice valve 61 interposed between the ports 31 and 32. The orifice valve 61 is an electromagnetic valve, and the orifice valve 40 is formed in the valve 62. Then, when the other actuator 1 (on the lower side) is in the hydraulically driving mode, the orifice valve 61 is opened to cause the ports 31 and 32 of the cylinder 21 to communicate with each other. Meanwhile, in the electrically driving mode (in particular, high-speed flying), the orifice valve 61 is closed to limit the flux between the ports 31 and 32 of the cylinder 21 by the orifice valve 40 in a valve body 62. Therefore, fluttering of the control surface 2 can be effectively suppressed.

Figure 5:
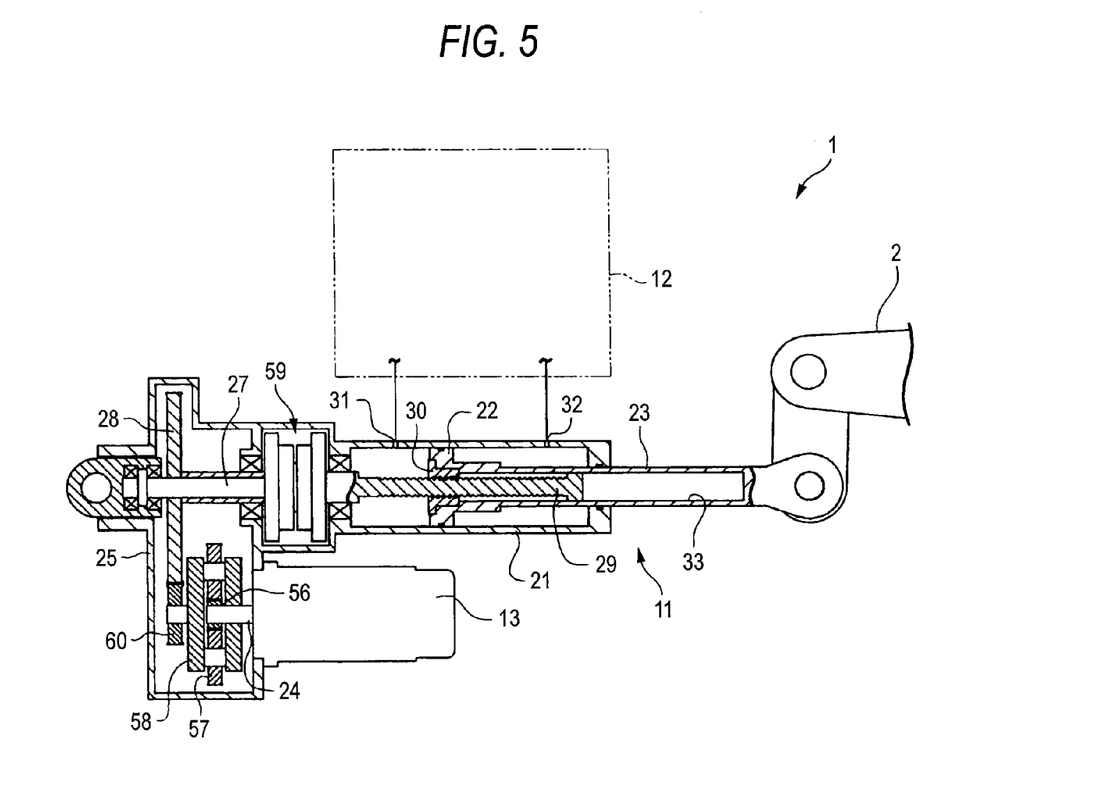
FIG. 5 is a schematic perspective view showing a third modification of the actuator.

As shown in FIG. 5, the electric motor 13 and the transmission shaft 27 may be connected to a planetary gear mechanism 55. In this configuration, a sun gear 56 is fixed to the output shaft 24 of the electric motor 13, and a small-diameter gear 60 is fixed to a carrier 58 that supports a planetary gear 57 meshed with the sun gear 56. Further, the small-diameter gear 60 is meshed with the large-diameter gear 28 of the transmission shaft 27. In this configuration, the output rotation of the output shaft 24 of the electric motor 13 is decelerated by the planetary gear mechanism 55 and the gear mechanism having the small-diameter gear 26 and the large-diameter gear 28 through two steps with an increased torque, and then is transmitted to the transmission shaft 27.

As shown in FIG. 5, a clutch 59 that cuts off and transmits power may be interposed between the output shaft 24 of the electric motor 13 and the screw shaft 29. As the clutch 59, for example, an electromagnetic clutch can be used. In the configuration of FIG. 5, for example, when the hydraulically driving mode is used as a normal mode, and the electrically driving mode is used as an abnormal mode, the clutch 59 is controlled to cut off power in the hydraulically driving mode, and the transmission shaft 27 or the output shaft 24 of the electric motor 13 is separated such that only the screw shaft 29 rotates when the piston 22 is hydraulically driven. Therefore, a power loss by inertia can be prevented. Further, when a reduction in oil pressure of the pressure line 41 is detected, the clutch 59 is controlled to transmit power, simultaneously with the arrival of the electrically driving mode.

Figure 6:
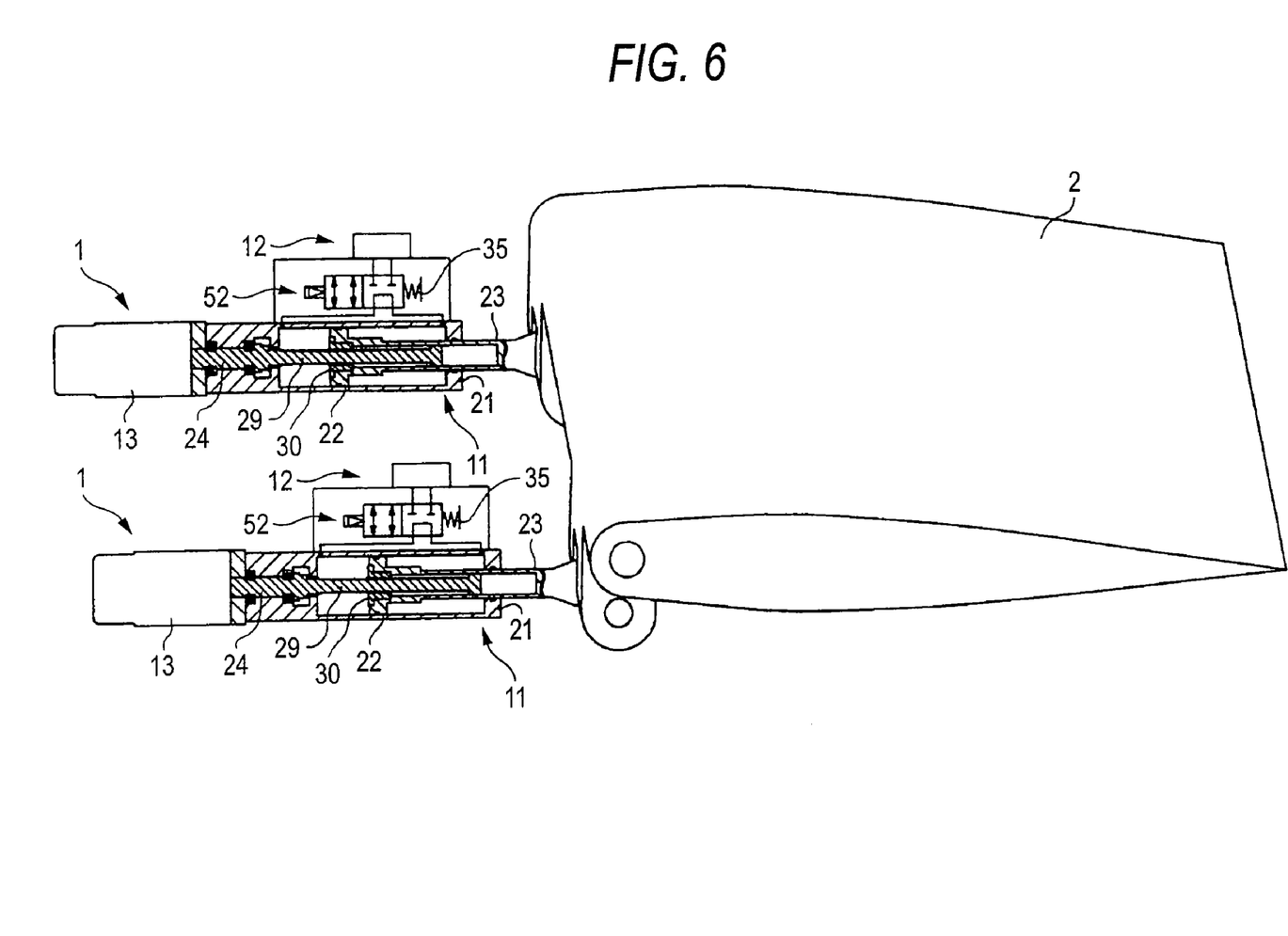
FIG. 6 is a schematic perspective view showing a fourth modification of the actuator.

As shown in FIG. 6, the output shaft 24 of the electric motor 13 and the screw shaft 29 may be concentrically disposed and directly connected to each other. According to this configuration, the gear mechanism may be not provided, and thus the configuration can be simplified. Further, the configuration, in which the electric motor 13 and the screw shaft 29 are directly connected to each other, may be combined with the modification of FIG. 3, in which the mode selector valve 52 is the three-position switch type, as shown in FIG. 7, or may be combined with the modification of FIG. 4, in which the orifice valve 61 is provided, as shown in FIG. 8.

From the embodiment and the modifications, at least the following technical spirit and effects can be grasped.

Figure 7:
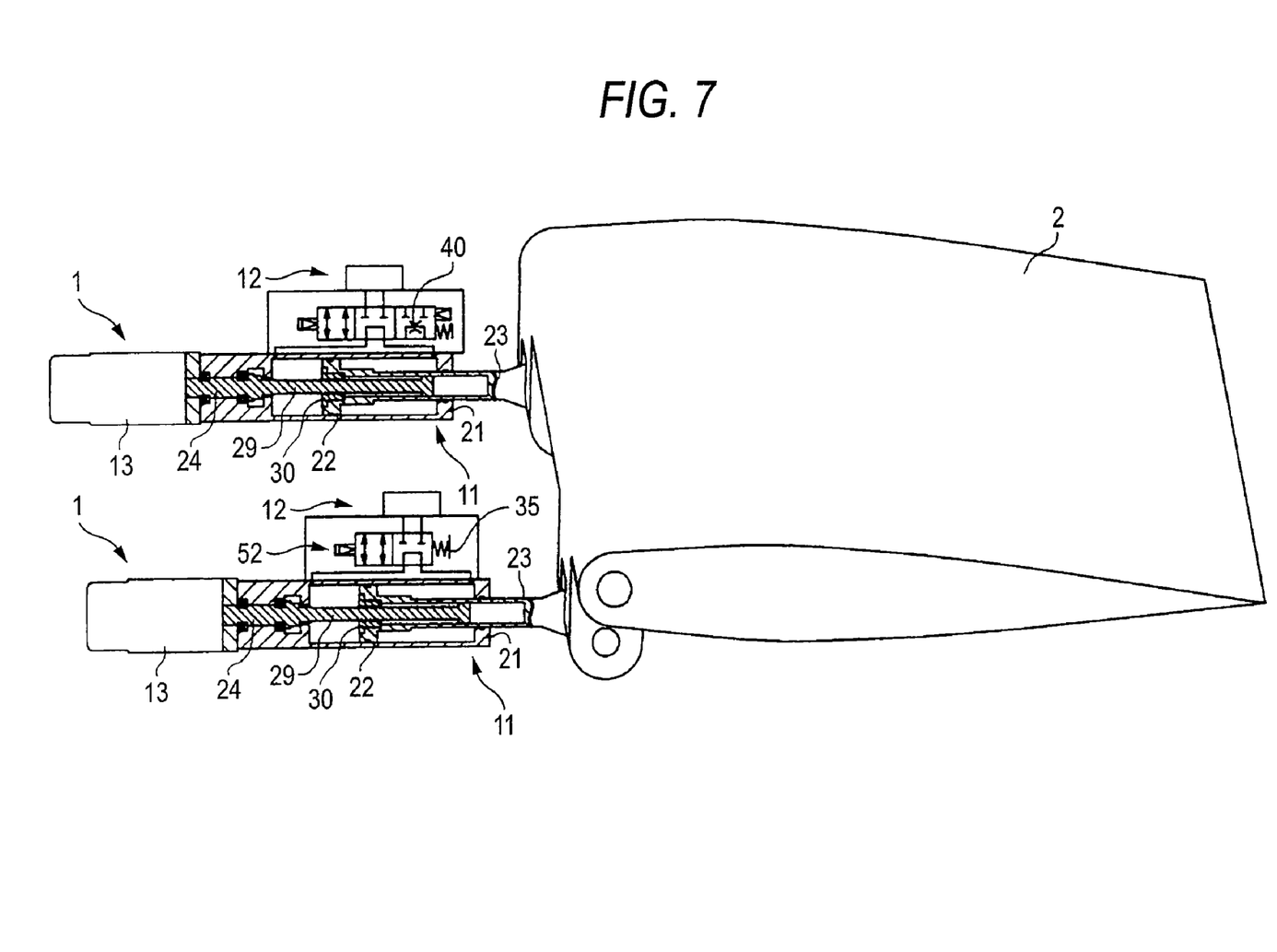
FIG. 7 is a schematic perspective view showing a fifth modification of the actuator.
Figure 8:
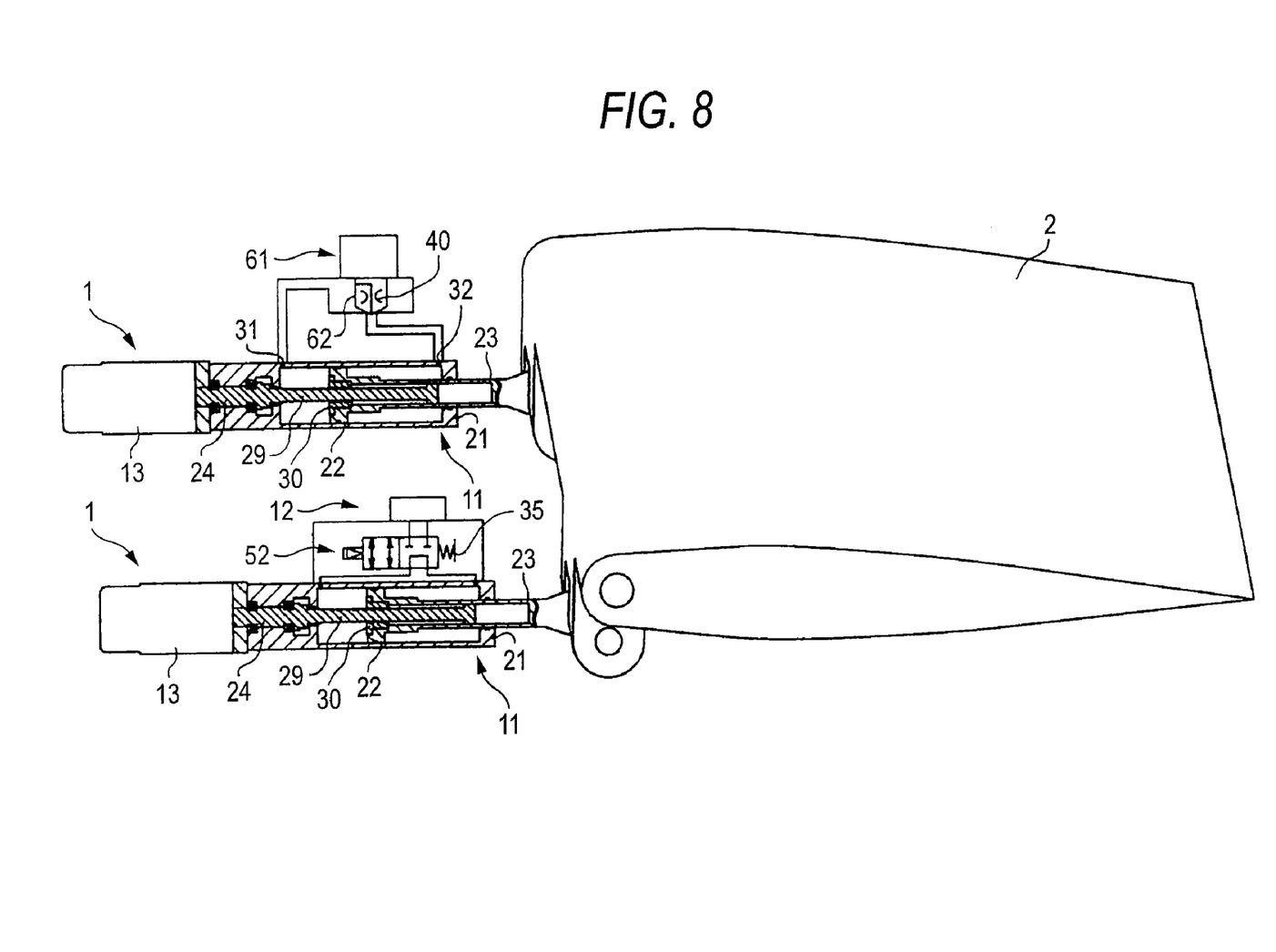
FIG. 8 is a schematic perspective view showing a sixth modification of the actuator.

(1) In the actuator, the mode selector valve may be switched among at least three positions of a first position where the two ports of the reciprocating cylinder do not communicate with each other, a second position where both ports communicate with each other, and a third position where both ports communicate with each other through an orifice valve (an actuator shown on the upper side in FIG. 3 or 7).

With this configuration, upon driving by electric power, the second switch value is located at the second position, such that the movable rod 23 can be smoothly driven by electric power. Further, when excessive vibration of the member to be driven (fluttering of the control surface 2) is worried, the second switch value is located at the third position, such that the vibration can be suppressed by an oil pressure damping effect.

(2) Actuator includes a cylinder, a piston that is disposed in the cylinder and divides an internal space of the cylinder, a movable rod that is connected to the piston, a screw shaft, at least a part of which is inserted into the movable rod, a nut that is screwed to the screw shaft and moves integrally with the piston, and an electric motor that rotates the screw shaft forward or backward. The divided internal spaces are connected to each other through a valve (the orifice valve 61). The valve is switched between at least two positions of a first position (a valve opening position) where both internal spaces communicate with each other with no orifice valve and a second position (a valve closing position) where both internal spaces communicate with each other through an orifice valve (the actuator shown on the upper side in FIG. 4 or 8).

With this configuration, when the valve is located at the first position, the movable rod can be smoothly driven by electric power. Further, when excessive vibration of the member to be driven (fluttering of the control surface 2) is worried, the valve is located at the second position, such that the vibration can be favorably suppressed by an oil pressure damping effect.

(3) There is provided an actuator mechanism that drives a member to be driven using a plurality of actuators. Each of the plurality of actuators has a cylinder, a piston that is movably disposed in the cylinder and divides an internal space of the cylinder, a movable rod that is connected to the piston, a screw shaft, at least a part of which is inserted into the movable rod, a nut that is screwed to the screw shaft and moves integrally with the piston, and an electric motor that rotates the screw shaft forward or backward. The plurality of actuators at least includes an actuator that connects the divided internal spaces to each other through an orifice valve, and an actuator that does not have orifice valve in a connection path of the internal spaces (see FIGS. 1, 3, 4, 7, and 8).

That is, when one member to be driven is driven by a plurality of actuators, the orifice valve may be provided in only some of the plurality of actuators. With this configuration, excessive vibration of the member to be driven can be suppressed. Further, the configuration can be simplified.

What is claimed is:

1. An actuator comprising:
   a cylinder;
   a piston that is disposed in the cylinder and moves by supply and exhaust of a working fluid to and from the cylinder;
   a movable rod that is connected to the piston;
   a screw shaft, at least a part of which is inserted into the movable rod;
   a nut that is screwed to the screw shaft and moves integrally with the piston; and
   an electric motor that rotates the screw shaft forward or backward.

2. The actuator according to claim 1,
   wherein the output rotation of the electric motor is transmitted to the screw shaft through a gear mechanism so as to drive the screw shaft.

3. The actuator according to claim 1, further comprising:
   a switch valve that switches the supply and exhaust of the working fluid to and from the cylinder.

4. The actuator according to claim 3,
   wherein the cylinder is a reciprocating cylinder, and
   the actuator further includes a mode selector valve that switches between at least two positions of a first position where one port of the cylinder and the other port do not communicate with each other and a second position where both ports communicate with each other.

5. The actuator according to claim 4, further comprising:
   a bias spring that biases the second switch value in a direction to be switched to the second position,
   wherein the second switch value is kept at the first position against the bias spring by working fluid pressure.

6. The actuator according to claim 4,
   wherein, at the second position, the mode selector valve causes one port of the cylinder and the other port to communicate with each other through an orifice valve.

7. The actuator according to claim 1,
   wherein the movable rod is connected to a control surface of an aircraft.

* * * * *